July 12, 1955  B. S. SNOW  2,712,953
CORD COUPLING
Filed Dec. 21, 1951
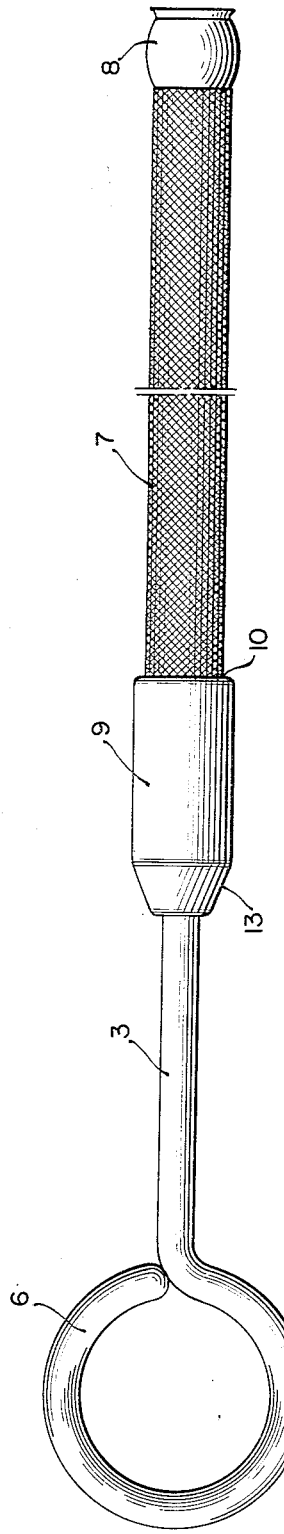
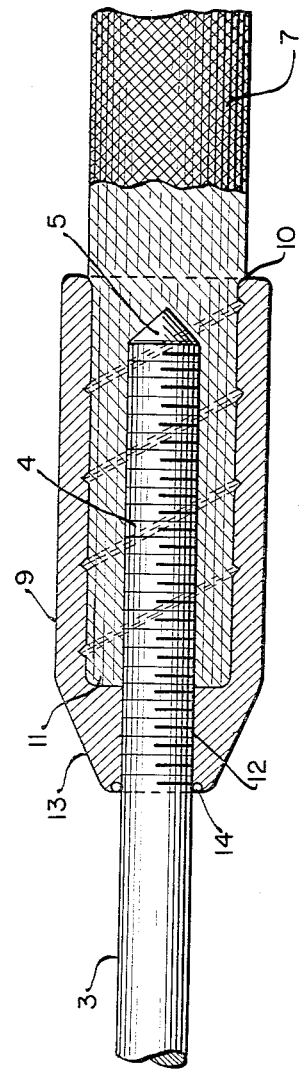
INVENTOR:
BARTON S. SNOW
BY: Schroeder, Merriam,
Hofgren & Brady
ATTORNEYS:

United States Patent Office 2,712,953
Patented July 12, 1955

2,712,953
CORD COUPLING

Barton S. Snow, Chicago, Ill., assignor to T. W. Snow Construction Company, Inc., a corporation of Illinois Application December 21, 1951, Serial No. 262,866

1 Claim. (Cl. 287—82)

This invention relates to couplings for a cord, and more particularly to a coupling for attaching a cord to a rod without employment of any tools or tying of knots.

The primary object of the invention is to provide a simple and inexpensive coupling which will enable a worn-out cord to be replaced without any tools.

A further object of the invention is to provide an improved metal coupling wherein the end of the cord to be attached is impaled by a pointed threaded rod, after the cord has been twisted into the annular socket so that the material is wedged into an opening, between a female thread in the coupling and a male thread, of a different pitch, on the rod. It has been found that the cord can be attached by hand, and the coupling is of sufficient strength that a ⅜" cord will support over five hundred pounds of tension.

The invention is of particular use in attaching warning cords to bronze rods that are used by railroads in front of bridges and tunnels, to warn trainmen on the top of cars that there is not sufficient clearance to stand up. These devices are known in the trade as "tell-tales."

The invention is illustrated in a preferred embodiment in the accompanying drawings, in which—

Fig. 1 is an elevational view, showing a cord attached to a rod with the improved coupling; and Fig. 2 is a longitudinal sectional view, on an enlarged scale, of the improved coupling.

In the embodiment illustrated, a metal rod 3, preferably of bronze, has a threaded end portion 4 which terminates in a sharp point 5. The other end of the rod may be provided with an eyelet 6 for attachment to a supporting head. A fibrous cord 7 is shown with a metal banding ring 8 for its free end, and may be attached to the rod 3 by means of a metal coupling 9.

The coupling, preferably cylindrical, has an open end 10 and a closed end 11 provided with a threaded opening 12 adapted to be screwed onto the rod 3 so that the pointed end 5 extends close to the open end 10. The outer portion of the closed end has a chamfer 13 and, if desired, after the coupling has been screwed onto the rod the outer thread of the coupling may be distorted by means of a punch, as indicated at 14, to restrain the coupler against unscrewing.

As shown in Fig. 2, an annular opening is provided between the rod and the sleeve portion of the coupler, and the inner sleeve wall is provided with female threads which have a large pitch.

To connect the cord to the rod, it is merely necessary to twist the cord into the coupler, and then screw the rod into the coupler from the opposite end. The point enters the end of the cord as shown in Fig. 2. This causes the enclosed end of the cord to be wedged firmly into the annular opening, and it can only be removed by unscrewing. It will be noted that the inner portion of the cord is held by a male thread of one pitch, and the outer portion of the cord is wedged against female threads of a substantially larger pitch.

The foregoing detailed description is given for clearness of understanding only, and no unnecessary limitations should be understood therefrom, for some modifications will be obvious to those skilled in the art.

I claim:

A tell-tale warning device for railroad approaches to overhead bridges comprising: a metal rod having a pointed threaded end portion; a hollow metal coupling having an inner wall, an open end and a closed end, said closed end having a threaded opening to screw onto said rod and provide an annular socket in said coupling, and said inner wall being provided with a spiral groove forming alternately spaced lands and valleys, the lands being substantially wider than the valleys; and a fibrous cord impaled by the pointed end of the rod so that, when the cord is completely inserted in the hollow coupling, the cord will bear an intimate surface contacting relationship with the lands of the inner wall of the coupling and will be impressed into the valleys.

References Cited in the file of this patent

UNITED STATES PATENTS

| Number | Name | Date |
|---|---|---|
| 206,566 | Hemelright | July 30, 1878 |
| 631,747 | Lloyd | Aug. 22, 1899 |
| 633,067 | Brien | Sept. 12, 1899 |
| 752,524 | Cowart | Feb. 16, 1904 |
| 1,381,779 | Williams | June 14, 1921 |
| 1,484,202 | Baker | Feb. 19, 1924 |
| 2,093,403 | Sertillange | Sept. 21, 1937 |

FOREIGN PATENTS

| Number | Country | Date |
|---|---|---|
| 9,073 | Switzerland | Sept. 20, 1894 |
| 428,591 | Great Britain | May 15, 1935 |